Sept. 29, 1970 R. L. LAIBLE 3,531,090
ELECTRICAL FENCE POST WITH WIRE-CONNECTOR
Filed July 28, 1969 2 Sheets-Sheet 1

RALPH L. LAIBLE
INVENTOR.

BY George R. Nimmer
ATTORNEY

Sept. 29, 1970    R. L. LAIBLE    3,531,090
ELECTRICAL FENCE POST WITH WIRE-CONNECTOR
Filed July 28, 1969    2 Sheets-Sheet 2

RALPH L. LAIBLE
INVENTOR.

BY George R Nimmer
ATTORNEY

United States Patent Office 3,531,090
Patented Sept. 29, 1970

3,531,090
ELECTRICAL FENCE POST WITH WIRE-CONNECTOR
Ralph L. Laible, 14008 N. 24th St., Rte. 6,
Omaha, Nebr. 68112
Filed July 28, 1969, Ser. No. 845,175
Int. Cl. A01k 3/00
U.S. Cl. 256—10     11 Claims

ABSTRACT OF THE DISCLOSURE

This invention relates to electrical fencing and particularly to novel wire-connector members for attaching the electrically conductive wire portion to the incrementally spaced upright fence post portions whereby the electrically conductive wires are maintained in electrical insulation with respect to the earth and further maintained in substantial parallelism with the underlying terrain. The wire-connector member is of springy elongate strip form with two endward perforations each surrounding the fence post whereby the wire-connector is selectably slidbly vertically positionable along and frictionally engageable with upright fence posts including with novel dual-segment fence posts of the present invention wherein two vertically aligned metallic rod segments are maintained in electrically-insulative relationship with an intermediate resinous-insulator.

---

Electric fences are commonly used in farming districts and elsewhere to provide a secure enclosure for cattle and other pasture stock, said electric fences preventing ingress and egress to the fenced enclosure by virtue of current-carrying horizontal wires held above and substantially parallel to the terrain by a plurality of incrementally spaced upright fence posts. There is necessarily some type of means to electrically isolate the current-carrying elongate wires from the earth to ensure that the electric current effectively travels along the entire enclosure periphery rather than to be "grounded" or shunted to the earth at a fence post station. Traditionally, such electrical insulation means between the current-carrying wire and the earth has taken one of the two following alternate generic forms. In the first form, there is the electrically-insulative fence post means wherein the fence post itself is electrically-insulative along the upright height thereof, including the use of wholly plastic or wooden posts, and oftentimes including the use of two vertically aligned metallic rods held in electrically-insulative reationship with an intermediate resinous-insuator. In the second form, there is the electrically-insulative wire-connector means wherein the fence post itself might be "fully conductive" as an uninterupted metallic rod but wherein the wire-connector is designed to provide electrical insulation between the current-carrying wire and the fence post. Each of these two traditional electrical insulation means has certain disadvantages which will be alluded to in the following objects and advantages of the present invention.

It is an object of the present invention to provide an electrical insulation means in which the vertical height of the current-carrying elongate horizontal wires (even while the current is "on") might be readily adjusted and changed appropriate to various kinds of enclosed animals and appropriate to mowing of vegetation growing near the electrical fence installation.

It is another object to provide an electrical insulation means in which the fence post itself is durable and weather-resistant and which, under inclement rainy weather, will neither deteriorate nor allow the electrical-insulative characteristics to be breached.

It is a further object to provide an electrical insulation means utilizing a wire-connector member that is reliable and of low cost and which can be safely manually installed onto and vertically adjusted along the upright fence post (even with the current "on") without the use of special and insulated-type tools.

It is another object to provide a wire-connector member which, in the environment of abruptly rolling, or even gullied terrain, will maintain a secure connection with the fence post and with the current-carrying wire even at the Zenith and nadir stressed conditions of the wire as it traverses in parallelism above such irregular earth surfaces.

It is a further object to provide a wire-connector concept, embodiments of which can be equally successfully employed with "fully-conductive" metallic fence posts wherein the electrical insulation means is provided solely by the wire-connector member, and with the novel dual-segment electrically-insulative fence post herein where the fence post itself provides the primary basis of the electrical insulation means.

It is another object to provide a wire-connector appropriate to fence posts of various cross-sectional shapes including circular, polygonal. T-shaped, various channeled forms, etc.

With the above and other objects and advantages in view, which will become more apparent as the description proceeds, the wire-connector member of the present invention is of springly elongate strip form with two endward perforations to provide an elongate medial portion therebetween, together with an upwardly resiliently deflectable elongate tongue and a pair of transversely-aligned upright tabs at the medial portion, whereby the current-carrying wire is securely held between the tongue restrained end and the tabs; the wire-connector itself is selectably slidably vertically positionable along and securely frictionally engageable to the upright fence posts (including the novel dual-segment post herein) at the wire-connector endward perforations depending upon the curvature manually afforded by an operator.

In the drawing, wherein like characters refer to like parts in the several views, and in which.

Figure 1:
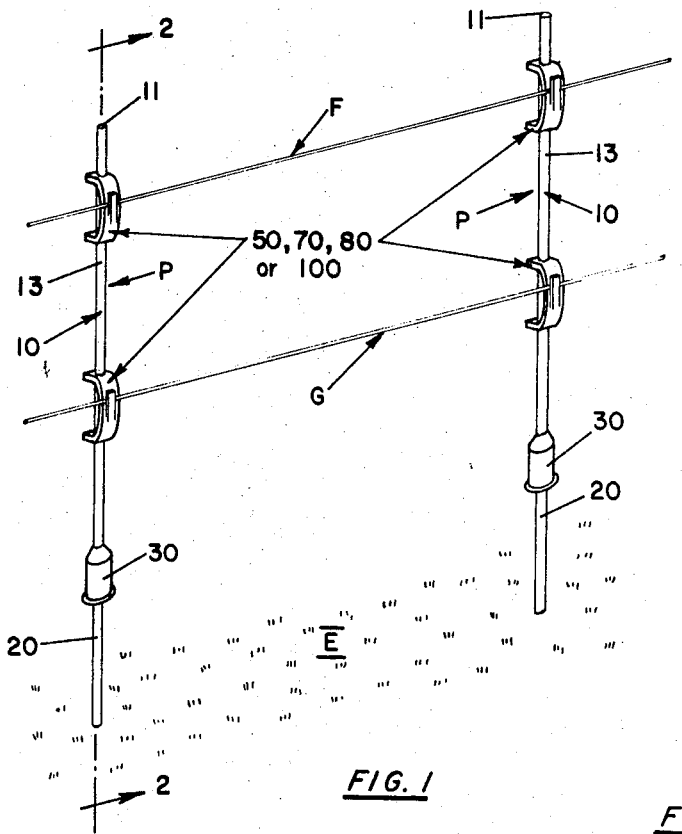
FIG. 1 is a perspective view of a typical length of electrical fencing wherein the novel fence post and the wire-connector of the present invention are employed to maintain the elongate conductor wires in elevation above and along the earth's surface.

FIG. 1 discloses a length of typical electrical fencing environment for the novel fence post and wire-connector of the present invention. Typical electric fencing comprises a plurality of upright fence posts, e.g. "P," each uprightly disposed along an upright central axis "A" and having an upper end terminus 11 and a lower end terminus 22 embedded into the earth "E." The upper portion 13 of each fence post "P" extending immediately downwardly from the upper end terminus 11 is rod-like and of regular cross-sectional shape (herein circular). One or more elongate conductor wires (herein as two separate wires "F" and "G") is each supplied with electrical current from a remote source (not shown) and passes transversely alongside each fence post e.g. "P," above the earth's surface "E" and in substantial parallelism thereto. A wire-connector member e.g. 50, 70, 80, 100, is employed to attach each elongate conductor wire to each fence post. If the fence post employed be of the prior art "fully conductive type" i.e. the entire post from the current carrying wires to the earth's surface comprises a single uninterrupted metallic rod, then the wire-connector member would need to provide an electrically-insulative type connection between the respective current carrying wires and the fence post. However, with dual-segment electrically-insulative fence posts e.g. the novel structure "P" of the present invention, the wire-connector member need not provide such electrically-insulative type connection for the current carrying wires.

The novel dual-segment electrically-insulative fence post "P" herein comprises a pair of finite length upright metallic rods 10 and 20 each disposed substantially along vertical central axis "A," and specifically herein as upper-rod 10 and as a lower-rod 20. Upper-rod 10 has an upper terminus 11 which is synonymous with the upper terminus of fence post "P," while lower-rod 20 has a downwardly-convergent lower terminus 22 which is synonymous with the fence post lower terminus and which is readily penetrable into the earth. An intermediate upright resinous-insulator 30 serves to electrically-insulatably elevate the upper-rod lower end 12 a small finite distance vertically above the lower-rod upper end 21. A generally triangular anchor plate 40 is firmly attached to lower-rod 20 intermediately of lower-rod termini 21 and 22, said anchor plate 40 having a downwardly convergent lower terminus 42 whereby anchor plate 40 and the portions of lower-rod 20 therebelow can be embedded into the earth so as to support upright fence post "P" along axis "A."

The fence post upper portion 13 extends downwardly from upper-rod upper end 11 and includes an upright surface surrounding axis "A" whereby the fence post upper portion 13 is of regular shape in horizontal cross-section, herein of circular cross-sectional shape. For the wire-connector embodiments 50, 80, and 100, the upright surface of the fence post upper portion might be smooth to the touch and free of knurls and similar radially extending projections. However, the upper-rod 10 and lower-rod 20 are preferably of the knurled upright surfaces shown in FIG. 2, for the purposes of adherently moldably attaching the resinous-insulator 30 and anchor plate 40, and with such knurled upper-rod 10, all four embodiments of the wire-connector herein including 70 are operable.

The upright upper surface of knurled metallic upper-rod 10 includes at least one outwardly-extending radial integral projection 14 and the upright upper surface of knurled metallic lower-rod 20 includes at least two outwardly-extending radial integral projections 24 and 25. Metallic radial projections 14 and 24 are disposed within the resinous structural material of 30 to ensure attachment of the moldably adherent resinous-insulator 30. Similarly, metallic radial projections 25 of lower-rod 20 are disposed within the resinous structural material of moldably adherently attached anchor plate 40. Resinous-insulator 30 has an upright vertically-ribbed periphery surrounding axis "A" and the rods 10 and 20, and has a transverse lower end 32 at which there is an annular integral resinous horizontal-rib 33 which provides the radial-extremity for resinous-insulator 30. Horizontal-rib 33, during rainy inclement weather, tends to direct water away from lower-rod 20 so as to ensure the electrically-insulative character of member 30 for metallic rods 10 and 20. Triangular anchor plate 40 surrounds axis "A," and the horizontal upper edge 41 thereof has termini disposed on opposite sides of axis "A." The anchor plate 40 has a sharpened downwardly-convergent lower edge 42 whereby an operator can press his foot against upper edge 41 and embed both the anchor plate 40 and underlying portions of lower-rod 20 into the earth.

Durable polycarbonate type resins are preferred for resinous-insulator 30 and for anchor plate 40, this durable structural material lending itself to unusually tenacious adherent moldable attachment to metallic rods 10 and/or 20. Polycarbonate resin is a linear polyester of carbonic acid with the following structure:

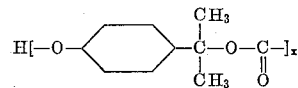

where "X" is at least one-hundred whereby the molecular weight is within the range of 25,000–70,000. Physical properties of such polycarbonate resins include:

(a) Specific gravity: 1.20
(b) Refractive index: 1.587
(c) Tensile strength: 8,000–9,000 per sq. inch
(d) Flexural strength: 11,000–13,000 per sq. inch.

Higher molecular weights, i.e. above about 40,000, are preferred to provide durable rigid anchor plates 40 and resinous-insulators 30.

Figure 2:
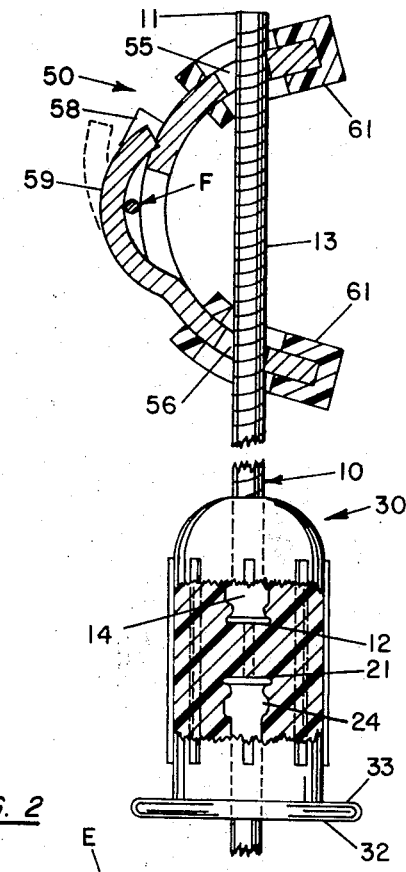
FIG. 2 is an enlarged sectional fragmentary elevational view taken along lines 2—2 of FIGS. 1 and 3 to shown certain novel features of the upright fence post and of the FIG. 3 wire-connector member.
Figure 3:
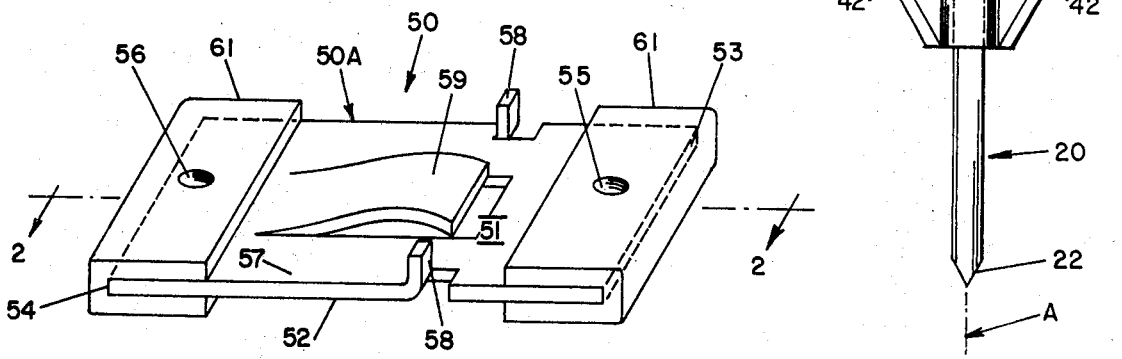
FIG. 3 is a perspective view of the wire-connector member portion of FIG. 2, before its physical frictional engagement to the upright fence post.
Figure 4:
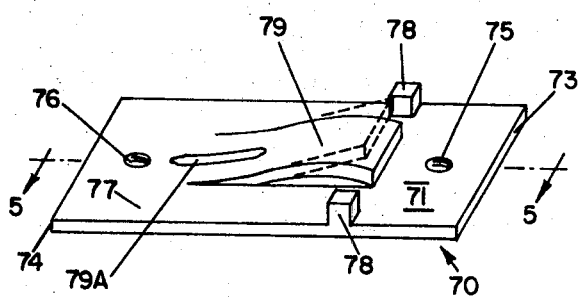
FIG. 4 is a perspective view of another embodiment of the wire-connector member of the present invention.
Figure 7:
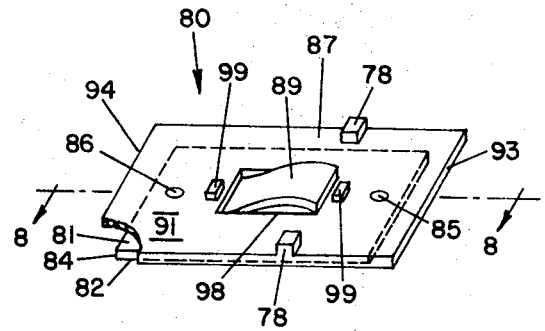
FIG. 7 is a perspective view of yet another embodiment of the wire-connector member of the present invention.
Figure 5:
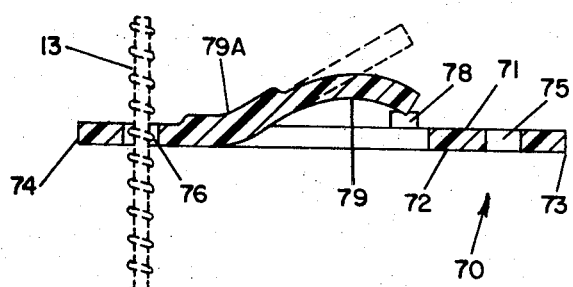
FIG. 5 is a sectional elevational view taken along line 5—5 of FIG. 4.
Figure 8:
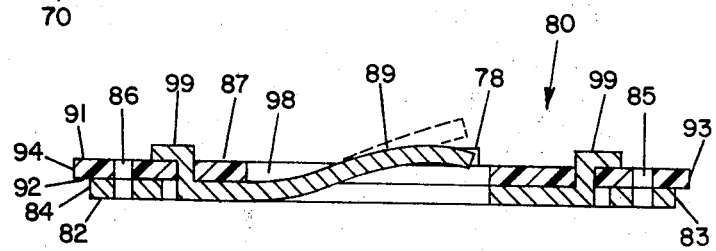
FIG. 8 is a sectional elevational view taken along line 8—8 of FIG. 7.
Figure 6:
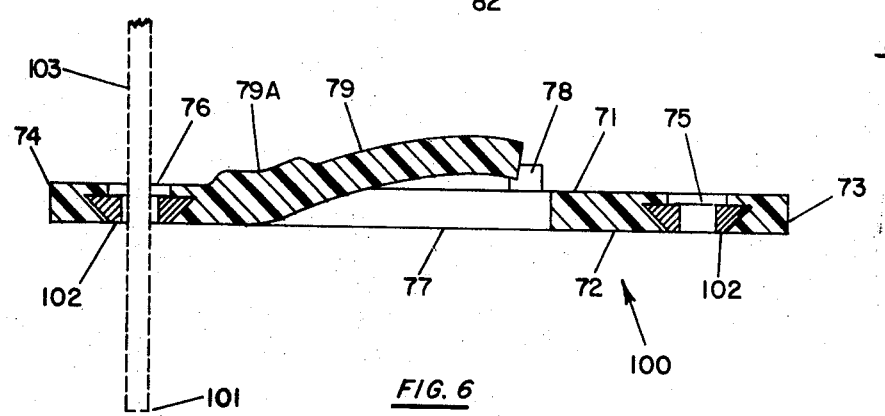
FIG. 6 is a sectional elevational view, similar to FIG. 5, of another embodiment of the wire-connector of the present invention.

The drawing illustrates four embodiments of the wire-connector member of the present invention: embodiment 50 of FIGS. 2 and 3; embodiment 70 of FIGS. 4 and 5; embodiment 80 of FIGS. 7 and 8; and embodiment 100 of FIG. 6. Embodiment 50 will be described initially, although the three alternate embodiments 70, 80, and 100 are of analogous structure and performance, except as specifically pointed out in the literal descriptions of the respective three alternate embodiments.

Wire-connector member 50 comprises an elongate generally rectangular strip of springy sheet material, herein as a springy sheet metal strap 50A, having a pair of opposed elongate surfaces including upper surface 51 and lower surface 52, and having a first end 53 and a second end 54. Adherently attached to the elongate surfaces 51 and 52 of sheet metal strip 50A adjacent to ends 53 and 54, respectively, are U-shaped resinous layers 61, thus providing a resinous upper side for the wire-connector 50 adjacent the two ends thereof. The springy elongate strip 50A has first and second endward perforations 55 and 56 through surfaces 51 and 52 adjacent to ends 53 and 54, respectively, said perforations 55 and 56 also extending through U-shaped resinous layers 61. Perforations 55 and 56 are geometrically similar to and about 5%–20% dimensionally larger than the regular horizontal cross-sectional shape of fence post upper portion 13, herein said geometric shape being arbitrarily chosen as circular. The elongate medial portion 57 of the wire-connector extending between the endward perforations 55 and 56 comprises the major fraction of the wire-connector length between its ends, herein said medial elongate portion 57 being wholly provided of the springy sheet metal strip 50A. The metallic strip 50A within wire-connector medial portion 57 integrally includes a pair of transversely aligned upwardly-extending tabs 58. Moreover, an elongate three-sided incision or slot through metallic medial portion 57 provides an elongate tongue 59 having a free end adjacent to tabs 58 and preferably positioned between tabs 58 and first perforation 55. As can be seen in phantom line in FIG. 2, the elongate tongue is upwardly resiliently deflectable so as to apply firm pressure on conductor wire e.g. "F," "G," against the wire-connector upper elongate surface.

Referring now to FIG. 2, the fence post upper portion 13 extends through both endward perforations, e.g. 55 and 56, of the wire-connector member whereby the wire-connector member is forced to assume a curved configuration with the wire-connector lower elongate side, e.g.

52, being concave. When the wire-connector respective endward portions, e.g. at 61, are manually held in substantial co-parallelism, the wire-connector can be readily moved along the fence post upper portion to whatever desired elevation. However, there must need be means to attain secure frictional engagement of the wire-connector member with the fence post upper portion at the first and second endward perforations as the springy wire-connector is allowed to re-flex whereby the lower side thereof decreases in concavity; such means for embodiment 50 includes the metallic peripheries of perforations 55 and 56 securely frictionally engaging with fence post upper portion 13. The resiliently-deflectable springy tongue, e.g. 59 (as indicated in phantom line in FIG. 2), can be temporarily manually displaced upwardly from the wire-connector upper side, e.g. 51, to allow the conductor wire, e.g. "F," to be firmly removably engaged between the tongue and the wire-connector elongate medial portion. It can also be seen that the conductor wire is maintained within the elongate space defined between the tongue restrained end and the transversely-aligned tabs, e.g. 58; thus, the conductor wire is firmly attached transversely alongside the fence post upper portion irrespective of the declination or inclination of the conductor wire along the geographical terrain. At nadir locations of the conductor wire, wire-connector 50 would be advantageously inverted on post "P" with perforation 56 disposed above 55.

The alternate wire-connector embodiment 70 of FIGS. 4 and 5 is a one-piece wholly resinous structure material, such as tough durable springy resinous chemicals including "nylon," or the aforedescribed polycarbonate resin (but at molecular weights preferably below about 40,000 to provide a springy wire-connector). Embodiment 70 is generally of elongate rectangular form having a pair of opposed elongate surfaces including upper surface 71 and lower surface 72, and having a first end 73 and a second end 74. The elongate strip has first and second endward perforations 75 and 76 adjacent to ends 73 and 74, respectively, defining therebetween elongate medial portion 77. Transversely-aligned resinous tabs or bosses 78 extending upwardly from the upper side 71 are in structurally-continuous integral relationship with elongate medial portion 77. Moreover, an elongate three-sided incision or slot through medial portion 77 provides an elongate upwardly resiliently-deflectable tongue 79 having a free end nearer to tabs 78. A thickened portion 79A is formed in the area where the tongue 79 joins the medial portion 77. The means for securely frictionally engaging wholly resinous wire-connector embodiment 70 with the fence post upper portion as the lower side 72 decreases to its limit of concavity when restrained by the fence post at endward perforations 75 and 76, necessitates a knurled or similarly roughened upright surface for the fence post upright portion 13 also described in conjunction with FIG. 2.

Embodiment 100 of FIG. 6 is identical to embodiment 70 in the top plan view, FIG. 4. With the exception of disc-like metallic washers 102 which are molded therewithin to provide sharp-edged metallic peripheries for perforations 75 and 76, the embodiment 100 is wholly resinous and otherwise identical to embodiment 70. By virtue of disc-like metallic insert layers 102, embodiment 100 will securely frictionally engage a smoothly surfaced, i.e. non-knurled, fence post upper portion 103 having upper terminus 101, as indicated in phantom line in FIG. 6.

Embodiment 80 of FIGS. 7 and 8 is a dual-layer or laminar structure that has several desireably structural and functional advantages. The lower layer comprises an elongate rectangular strip of springy sheet metal similar to 50A having a pair of opposed elongate surfaces including upper surface 81 and lower surface 82 (which provides the elongate lower side of embodiment 80), and having a first end 83 and a second end 84. The upper layer comprises a wholly-resinous rectangular springy strip similar to the resinous strap embodiment 70 having a pair of elongate surfaces including upper surface 91 (which provides the elongate upper side of embodiment 80) and lower surface 92, and having a first end 93 and a second end 94; the length of the resinous upper layer between its ends 93 and 94 exceeds that of the metallic lower layer between its ends 83 and 84. The resinous upper layer has a pair of transversely-aligned resinous tabs or bosses 78 extending upwardly from upper surface 91 and being in structurally continuous integral relationship with the rest of the upper layer. Embodiment 80 includes first and second endward perforations 85 and 86 through both layers near ends 83 and 84, respectively, defining therebetween elongate medial portion 87. The upper layer at the wire-connector elongate medial portion 87 is provided with an elongate rectangular opening 98 commencing substantially at tabs 78 and extending toward second perforation 86. An elongate three-sided incision through the lower metallic layer immediately below upper layer rectangular opening 98 provides an elongate tongue 89, said tongue 89 being permanently upwardly curved as shown in solid line in FIGS. 7 and 8. Moreover, as indicated in phantom line in FIG. 8, the tongue 89 is upwardly resiliently-deflectable. Inter-layer attachment is afforded by the use of fingers 99 (provided by two three-sided incisions in the metallic lower layer and which extend upwardly through holes in the upper resinous layer, said mechanical attachment fingers 99 being bent tightly laterally against the permanently resinous layer upper surface 91. The downwardly-recessed restrained end of tongue 89 provides exceedingly secure engagement of wire connectors, e.g. "F" and "G"; and the mechanically attached lengthy upper resinous layer to the metallic lower layer provides exceptional utility in both the dual-segment electrically-insulative fence post "P" and in the prior art "fully conductive" type fence posts.

From the foregoing, the construction and operation of the fencing assembly will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In combination with an upright fence post disposed along an upright central axis and terminating as an upper end, the upper portion of said upright fence post extending downwardly from the upper end terminus including an upright surface surrounding the central axis whereby the fence post upper portion is of regular transverse cross-sectional shape, an elongate conductor wire passing transversely alongside the fence post upright upper portion, and a wire-connector member selectably frictionally and slidably surrounding the fence post upright upper portion attaching the elongate conductor wire to the fence post, said wire-connector member comprising: an elongate strip of springy material including an upper elongate side, a lower elongate side generally parallel to the upper side thereof, a first end, and a second end, said springy elongate strip having first and second perforations through the opposed elongate sides adjacent to the first and second ends, respectively, and the springy elongate strip having an elongate medial portion disposed between the first and second perforations, the first and second perforations being geometrically similar to and dimensionally larger than the regular cross-sectional shape of the fence post upper portion, the upper side of the said wire-connector at the ends being provided of a resinous electrically-insulative material, the wire-connector medial portion including a pair of transversely aligned tab portions and including a tongue with a restrained end and a free end adjacent to said tab portions, said tabs and tongue being integrally attached to the elongate strip medial portion and extending above the upper elongate surface of the medial portion, the tongue portion being resiliently upwardly deflectable so as to receive the elongate conductor wire between the tongue and the upper elongate surface of the elongate strip medial portion and between the tongue restrained end and the two upwardly extending tabs, the fence post upright upper portion slidably extending through the first and second perforations of the wire-connector member whereby the said wire-connector is forced to assume a curved configuration with the lower elongate side thereof being concave, and means to securely frictionally engage the wire-connector with the fence post upright surface at the peripheries of the first and second perforated portions as the concavity of the lower elongate side is decreased.

2. The combination of claim 1 wherein the upright surface of the fence post upper portion is transversely knurled at regular intervals along the height thereof and wherein the wire-connector at the peripheries of the first and second portions comprises a hard resinous material to provide the increasable friction means between the fence post upper portion and the wire-connector member.

3. The combination of claim 2 wherein the knurled upright portion of the fence post is of circular transverse cross-sectional shape; and wherein the wire-connector member is wholly provided of a single length of polycarbonate resin springy material.

4. The combination of claim 3 wherein the upright fence post comprises: a finite length upper-rod disposed along the upright central axis and providing the fence post upper portion extending downwardly from the upper terminus thereof, said upper-rod having a lower end; a finite length lower-rod disposed along the upright central axis below the upper-rod and haivng an upper end and a lower-end; and an upright intermediate resinous-insulator surrounding the upright central axis and providing a resinous electrically-insulative finite separation between the upper-rod lower end and the lower-rod upper end, said resinous-insulator being attached to both the upper-rod and the lower-rod.

5. The combination of claim 1 wherein the wire-connector member comprises an elongate structurally-continuous length of resiliently deflectable springy resinous sheet-like material extending between the two ends thereof, said resinous material providing the elongate upper side and also the elongate upper surface at the medial portion including the pair of tabs and elongate tongue, the resinous material below the wire-connector elongate upper side having attached thereto a thin metallic layer disposed at the periphery of the two perforate portions to provide the increasable friction means between the fence post upper portion and the wire-connector member.

6. The combination of claim 4 wherein the elongate length of resiliently-deflectable springy resinous sheet-like material including the integral tabs and tongue comprises polycarbonate resin.

7. The combination of claim 1 wherein the wire-connector member comprises an elongate strap of springy resiliently-deflectable sheet metal extending between the two ends thereof, the sheet metal strap being provided with first and second perforate portions through the opposed elongate surfaces adjacent to the respective first and second ends thereof, said springy metallic strip elongate medial portion being provided with a three-sided incision therethrough as said tongue portion, the upper surface of said springy elongate metallic strip at the first and second ends thereof and at the periphery of the first and second perforate portions having an integrally attached layer of electrically-insulative flexible resinous material.

8. The combination of claim 7 wherein the integrally attached layer of electrically-insulative flexible resinous material extends continuously between the first and second ends of the elongate metallic strap to provide the wire-connector upper side, the said resinous layer having an elongate medial opening with the metallic tongue extending upwardly therethrough, the said flexible resinous layer having integral resinous bosses to provide the tab portions.

9. The combination of claim 8 wherein the metallic strap layer has a pair of bent fingers extending upwardly through the resinous layer to attach the resinous layer to the metallic strap layer; and wherein the first and second perforate portions of the wire-connector extend through both the metallic strap layer and the flexible resinous layer.

10. The combination of claim 9 wherein the upright fence post comprises a finite length upper-rod disposed along the upright central axis and providing the fence post upper portion extending downwardly from the fence post upper terminus, said upper-rod having a lower end; a finite length lower-rod disposed along the upright central axis below the upper-rod and having an upper end and lower end; and an upright intermediate resinous-insulator providing a resinous electrically-insulative separation of finite vertical height between the upper-rod lower end and the lower-rod upper-end, said resinous-insulator being affirmatively attached to the upper-rod and to the lower-rod, said resinous-insulator having a transverse lower end and integrally including an annular rim surrounding the upright central axis and providing the radial extremity of the resinous-insulator.

11. The combination of claim 10 wherein the upright elongate surface of the upper-rod circularly surrounds the upright central axis and includes at least one outwardly-extending projection nearer to the lower end than to the upper end; wherein the upright elongate surface of the lower-rod surrounds the upright central axis and includes at least two outwardly-extending projections including a first projection nearer to the upper end than to the lower end and a second projection below the first projection; wherein the resinous-insulator is adherently molded to the upper-rod including to the at least one projection therein and to the lower-rod including to the first projection thereof; wherein there is a generally triangular resinous anchor plate having an upright bore therethrough surrounding the fence post upright central axis and the lower-rod, said resinous anchor plate being adherently molded to the lower-rod including to the second projection thereof, said anchor plate having a substantially horizontal upper edge with termini disposed on opposite sides of the upright central axis, said anchor plate having a sharpened V-shaped lower edge converging downwardly from the upper edge termini toward the upright central axis; and wherein the wire-connector endward perforations are circular.

References Cited

UNITED STATES PATENTS

| | | | |
|---|---|---|---|
| 2,805,277 | 9/1957 | Moeller | 174—158.2 X |
| 3,001,765 | 9/1961 | Shobert | 174—158.2 X |
| 3,370,834 | 2/1968 | Reznicek | 256—10 |

FOREIGN PATENTS 252,970   10/1948   Switzerland.

LARAMIE E. ASKIN, Primary Examiner

U.S. Cl. X.R.

24—243; 52—153, 165, 721; 174—45, 161; 256—54